United States Patent [19]
Mizutani et al.

[11] Patent Number: 5,260,616
[45] Date of Patent: Nov. 9, 1993

[54] PERMANENT MAGNET TYPE STEPPING MOTOR

[75] Inventors: Minoru Mizutani; Kuniharu Hayashi; Toshiyuki Sato, all of Tokyo, Japan

[73] Assignee: OKI Electric Co., Ltd., Tokyo, Japan

[21] Appl. No.: 731,262

[22] Filed: Jul. 17, 1991

[30] Foreign Application Priority Data

Jul. 25, 1990 [JP] Japan ................................. 2-78901

[51] Int. Cl.$^5$ .......................................... H02K 37/00
[52] U.S. Cl. .................................. 310/49 R; 310/112; 310/156; 310/257
[58] Field of Search ................. 310/49 R, 49 A, 162, 310/257, 163, 164, 165, 156, 112, 194

[56] References Cited

U.S. PATENT DOCUMENTS

| | | | |
|---|---|---|---|
| 2,548,633 | 4/1951 | Stephenson | 310/162 |
| 4,355,248 | 10/1982 | Manson | 310/49 R |
| 4,363,984 | 12/1982 | Torii | 310/156 |
| 4,438,361 | 3/1984 | Manson | 310/49 R |
| 4,480,614 | 11/1984 | Kobashi | 310/49 R |
| 4,672,247 | 6/1987 | Madsen | 310/49 R |
| 4,714,850 | 12/1987 | Akiba | 310/49 R |
| 4,990,806 | 5/1991 | Kikuchi et al. | 310/49 A |

FOREIGN PATENT DOCUMENTS

| | | |
|---|---|---|
| 0341867 | 11/1989 | European Pat. Off. |
| 2613038 | 10/1976 | Fed. Rep. of Germany |
| 3238262 | 4/1984 | Fed. Rep. of Germany |
| 63-43562 | 2/1988 | Japan |
| 2211030 | 6/1989 | United Kingdom |

Primary Examiner—R. Skudy
Attorney, Agent, or Firm—Spencer, Frank & Schneider

[57] ABSTRACT

A permanent magnet type stepping motor comprising first and second stator assemblies arranged coaxially about a longitudinal axis. Each assembly includes first and second ring-shaped stators made of magnetic material. The first ring-shaped stator has a central portion with an opening therein, an annular yoke surrounding the periphery of the central portion and a plurality of pole pieces distributed about the circumference of the opening and extending toward a plane transverse to the axis. The second ring-shaped stator has a central portion with an opening therein, an annular substantially planar yoke surrounding the periphery of the central portion and a plurality of pole pieces distributed about the circumference of the opening and extending away from the transverse plane so as to interleave with the pole pieces of the first stator. The central portion of the second stator protrudes from the plane of the yoke in a direction away from the transverse plane. A coil is interposed between the first and second ring-shaped stators and surrounds the pole pieces. The first and second stator assemblies are arranged with respect to the transverse plane so that the second ring-shaped stator of the first stator assembly is adjacent the second ring-shaped stator of the second stator assembly at the transverse plane thereby forming a gap between the protruding central portions of the second stators of the first and second stator assemblies. A permanent magnet having N and S poles distributed alternately about the outer circumference thereof is rotatably supported within the openings in the central portions of the first and second stators of the first and second stator assemblies.

1 Claim, 4 Drawing Sheets

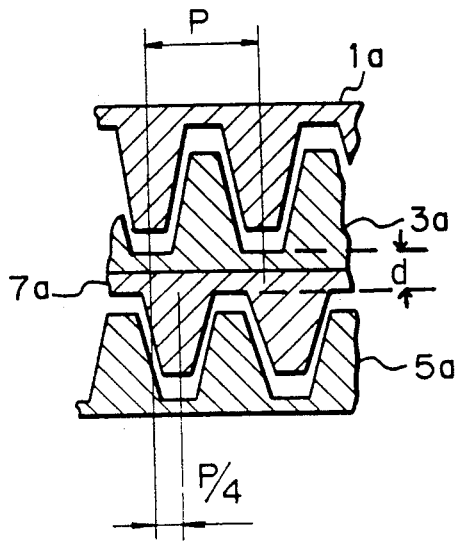
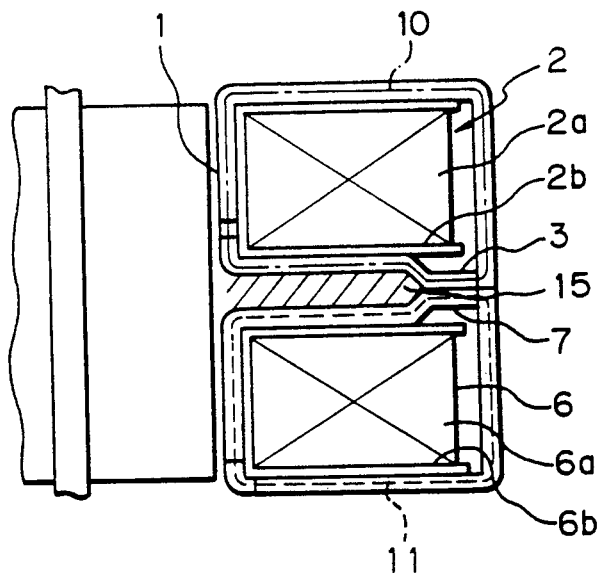
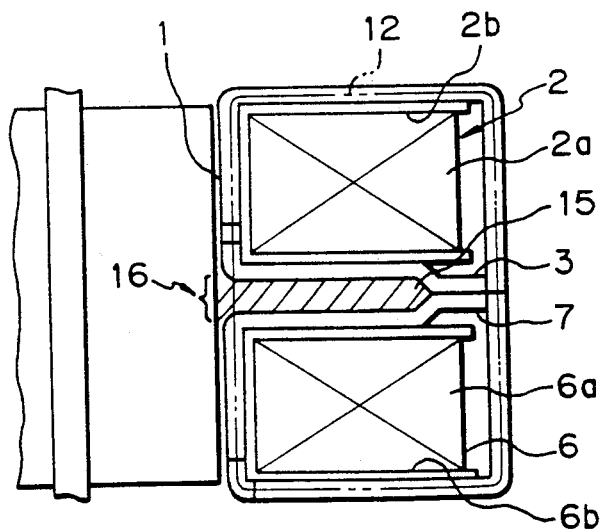

PERMANENT MAGNET TYPE STEPPING MOTOR

BACKGROUND OF THE INVENTION

1. Field of the Invention

The present invention relates to a permanent magnet type (PM type) stepping motor.

2. Description of Related Art

A stepping motor can be used for driving, e.g. a print head or a platen roll of a printer. A stepping motor of this type is disclosed in U.S. Pat. No. 4,990,806. The PM type stepping motor comprises in general coils wound around pole pieces, ring-shaped stators and a rotor composed of a permanent magnet disposed at the central portion of the stators.

In conventional PM type stepping motor a problem exists in that the drive efficiency of the motor is decreased because of eddy currents and heat generation caused by Joule heating occurred.

SUMMARY OF THE INVENTION

It is an object of the present invention to provide a PM type stepping motor capable of reducing an eddy current generated in its stators.

It is another object of the present invention to provide a PM type stepping motor capable of performing a high drive efficiency.

To achieve the above objects, the PM stepping motor according to the present invention comprises first and second stators each composed of two pairs of ring-shaped magnets in which one pair is put on the other pair, each pair having pole pieces arranged along inner circumferences thereof, first and second coils disposed to surround the pole pieces of the first and second stators, and a permanent magnet having N poles and S poles arranged alternately along an outer circumference thereof, said permanent magnet being rotatably supported by and disposed in the central portion of the first and second stators, characterized in that gaps are defined at a part of the portion where one pair of the magnets is put on the other pair.

With the arrangement set forth above, the magnetic reluctance between the stators is increased and the eddy current can be reduced by reducing the magnetic flux which passes in the axial direction of the pole pieces positioned at upper and lower positions.

BRIEF DESCRIPTION OF THE DRAWINGS

FIG. 4 is a cross sectional view of pole pieces which are, constituents of the PM type stepping motor in FIG. 3;

FIG. 5 is a view showing a magnetic path in FIG. 2;

FIG. 6 is a view showing another magnetic path in FIG. 2;

DESCRIPTION OF THE PREFERRED EMBODIMENT

Figure 1:
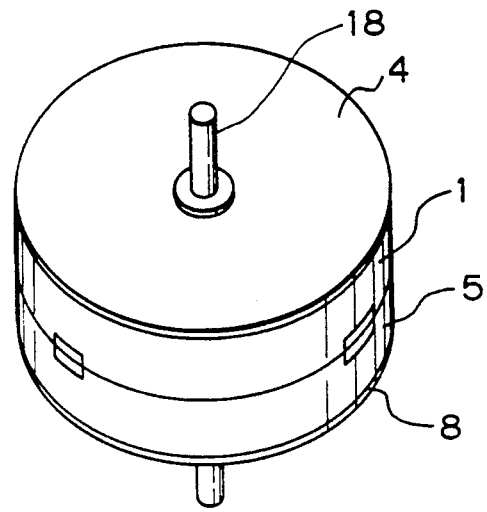
FIG. 1 is a perspective view of a PM type stepping motor according to a preferred embodiment of the present invention.

FIG. 1 is an external view of a PM type stepping motor according to a preferred embodiment of the present invention. As illustrated in FIG. 1, the motor comprises stators 1 and 5 and supporting plates 4 and 8. A motor shaft 18 is fixed to the central portion of the stators 1 and 5.

Figure 2:
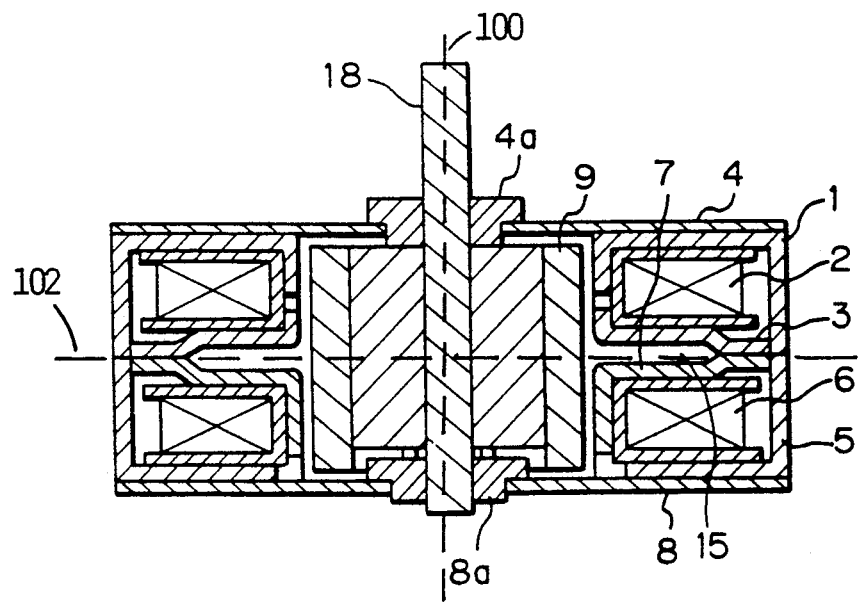
FIG. 2 is a cross sectional view of the PM type stepping motor shown in FIG. 1.
Figure 3:
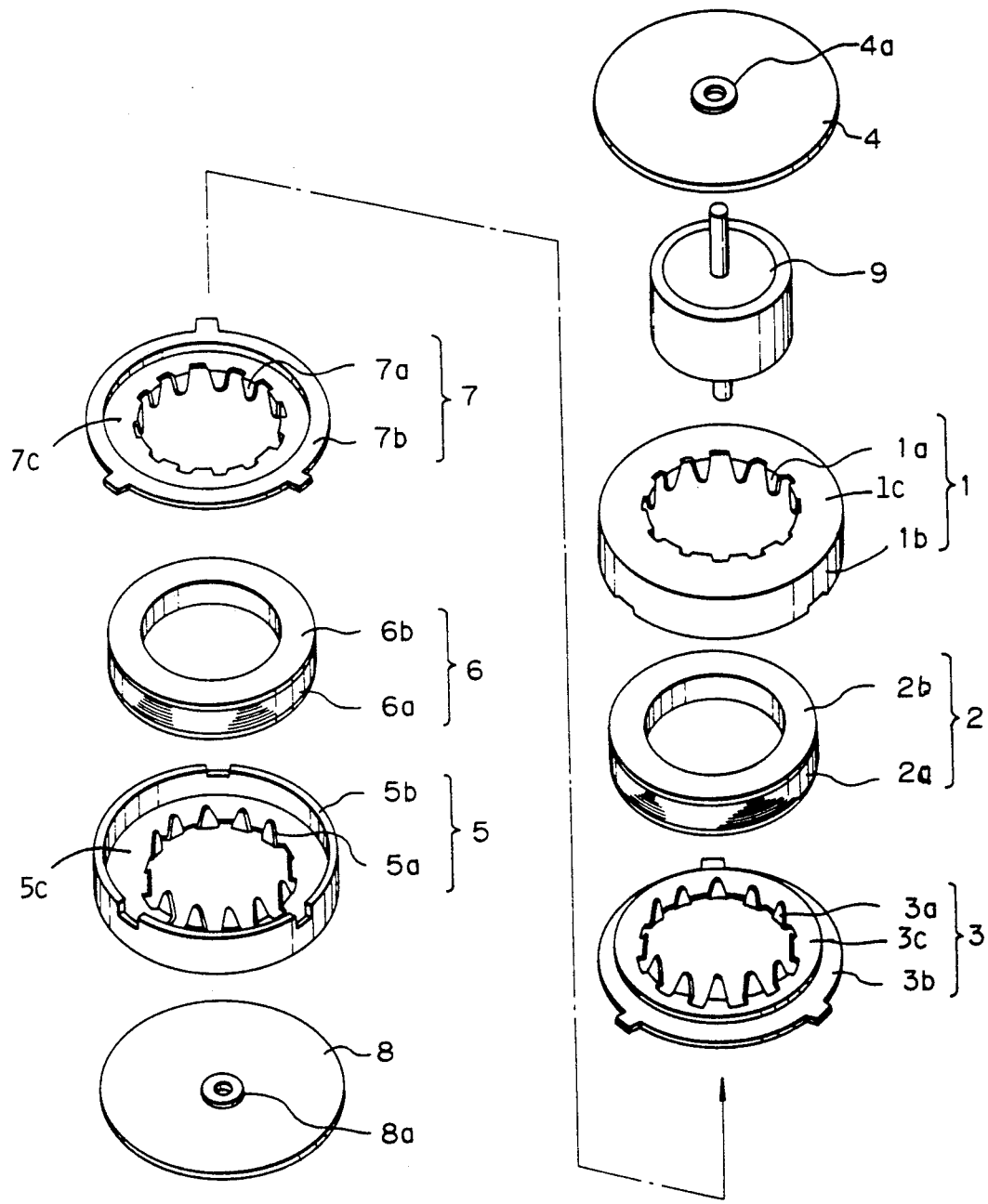
FIG. 3 is an exploded perspective view of the PM stepping motor of FIG. 1.

In FIG. 2, elements denoted at 1, 3, 5 and 7 are stators and formed by bending or drawing a magnetic plate, stators 1 and 3 forming a first stator assembly and stators 5 and 7 forming a second stator assembly. The first and second stator assemblies are arranged coaxially about a longitudinal axis 100, and are separated by a plane extending transverse to the longitudinal axis having a line 102 therein. As illustrated in FIG. 3, the stators 1 and 5 have respectively cap-shaped configurations and have a plurality of pole pieces 1a and 5a formed by bending them at right angles at central openings thereof. Stators 1 and 5 are also provided with annular yokes 1b and 5b and central portions 1c and 5c respectively. Likewise, the stators 3 and 7 are ring-shaped and have a plurality of pole pieces 3a and 7a formed by bending them at right angles at the central openings thereof. Stators 3 and 7 have peripheral planar portions or yokes 3b and 7b, and central portions 3c and 7c protruding from the planes of their respective yokes.

As shown in FIG. 4, when the stators 1 and 3 are assembled, the pole pieces 1a and 3a are alternately arranged about the circumferences thereof. Likewise, the pole pieces 5a and 7a are alternately arranged about the circumferences thereof. The pole pieces 1a and 3a of a first group and pole pieces 5a and 7a of a second group are disposed at a displacement of P/4 where P is the equal angular interval between the pole pieces. The displacement of P/4 corresponds to be $\pi/2$ angular electrical phase difference. The stators 3 and 7 protrude at the central portions 3c aand 7c thereof while the peripheries thereof do not protrude. The central portions 3c of the stator 3 protrudes upward while the central portion 7c of the stator 7 protrudes downward. The upward and downward protrusions can be formed by subjecting the plate to a drawing process. Inasmuch as the central portions of the stators 3 and 5 protrude while the peripheries thereof do not protrude, gaps d are defined between the roots of the teeth of the pole pieces 3a and 7a.

Denoted at 2 is a first coil assembly composed of a first bobbin 2b and a first coil 2a wound around the bobbin 2b. Denoted at 6 is a second coil assembly composed of a second bobbin 6b and a second coil 6a wound around the bobbin 6b. Denoted at 9 is a permanent magnet having n pieces of N-poles and S-poles alternately polarized and arranged along the circumference thereof. A ferrite magnet available at low cost is used as the permanent magnet. A rare-earth magnet, such as a SmCo based magnet may also be used as the permanent magnet. Denoted at 4 and 8 are supporting plates having bearings 4a and 8a at the central portions thereof for supporting a shaft 18 of the permanent magnet 9.

According to the PM type stepping motor, there are defined gaps 15 forming an air layer between the roots of the teeth of the pole pieces 3a and 7a as shown in FIGS. 2, 3 and 4 for increasing the magnetic reluctance in the magnetic circuit formed by the first and second stators 3 and 7 when the first and second stators 3 and 7 are assembled.

The operation of the PM type stepping motor of the present invention will be described with reference to FIGS. 2 to 8.

When alternating first and second currents are applied to the first and second coils 2a and 6a, which are staggered by ¼ period, a rotating magnetic field is generated whereby the permanent magnet 9 is rotated in synchronization with the rotating magnetic field. When the current is applied to the first and second coils 2a and 6a, the route of the magnetic flux, i.e., magnetic paths are formed as illustrated in FIGS. 5 and 6.

Referring to FIGS. 3 and 5, the magnetic flux generated by the coil 2a passes through a magnetic path 10 defined by the pole pieces 1a and 3a and 3b as illustrated by a dotted chain line. Similarly, referring to FIGS. 3 and 6, the magnetic flux generated by the coil 6a passes through a magnetic path 12 defined by the pole pieces 5a and 7a and yokes 5b and 7b.

Figure 7:
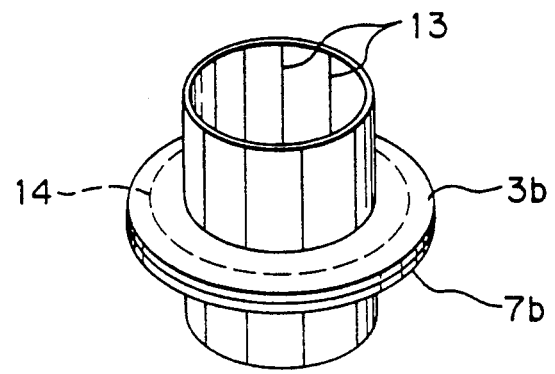
FIG. 7 is a view showing an eddy current.

The eddy current will be described with reference to FIGS. 3 and 7. The eddy current, which follows a path 14 in yokes 3b and 7b, is generated by the magnetic flux piercing axially the upper pole pieces 1a and 3a and the lower pole pieces 5a and 7a. That is, the eddy current is generated by a magnetic flux 13 passing through the magnetic path 12 as illustrated in FIG. 6. The magnetic flux 13 generates a circumferential magnetic field in yokes 3b and 7b whereby the eddy current is generated in the yokes 3b and 7b.

In to the PM stepping motor of the present invention, since an air layer is defined between the first and second stators 3 and 7 by the gaps 15 between the pole pieces 3a and 7a at the roots thereof, the magnetic flux passes with difficult to pass through the magnetic path. The reason is that the permeability of the air layer is one several hundredth as much as that of a conventional magnetic material thereby rendering the magnetic reluctance in the air layer extremely high and also making it difficult for the magnetic flux to pass through the portion denoted by arrow 16. Accordingly, the eddy current is reduced.

Figure 8:
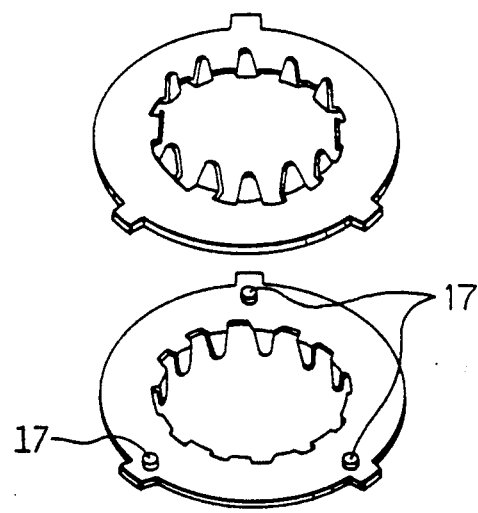
FIG. 8 is a perspective view showing a pair of stators.

The air layer may be defined as part of the magnetic path 12, as illustrated in FIG. 6. Accordingly, the air layer may be defined at an outer periphery of the motor instead of at an inner periphery of the motor as illustrated in FIG. 3. The air layer may be formed by providing a projection 17 at one of the stators as illustrated in FIG. 8.

As explained above, since the PM stepping motor according to the present invention has gaps between the first and second stators, it is possible to increase the magnetic reluctance in the magnetic circuit formed by the first and second stators. Accordingly, the eddy current loss is reduced thereby preventing the drive efficiency of the PM motor from being decreased and the PM motor from overheating.

The PM motor of the present invention enables the print head and the like in a printer to be drive stably for a long period of time.

What is claimed is:

1. A permanent magnet type stepping motor comprising:

first and second stator assemblies arranged coaxially about a longitudinal axis, said first and second stator assemblies being separated by a plane extending transverse to said longitudinal axis, each of said first and second stator assemblies including a first ring-shaped stator made of magnetic material and having a central portion with an opening therein, an annular yoke surrounding a peripheral of said central portion and a plurality of pole pieces distributed about a circumference of said opening and extending toward said transverse plane;

a second ring-shaped stator, made of magnetic material, having a central portion with an opening therein, an annular substantially planar yoke surrounding a periphery of said central portion and a plurality of pole pieces distributed about a circumference of said opening, said pole pieces extending away from said transverse plane so as to interleave with the pole pieces of said first ring-shaped stator, the central portion of said second ring-shaped stator, the central portion of said second ring-shaped stator protruding from the plane of said yoke in a direction away from said transverse plane; and a coil interposed between said first and second ring-shaped stators, said coil surrounding the pole pieces thereof;

said first and second stator assemblies being arranged with respect to said transverse plane so that the second ring-shaped stator of said first stator assembly is adjacent the second ring-shaped stator of said second stator assembly at said transverse plane thereby forming a gap between the protruding central portions of the second ring-shaped stators of said first and second stator assemblies; and a permanent magnet having N and S poles distributed alternately about an outer circumference thereof, said permanent magnet being rotatably supported within the openings in the central portions of the first and second ring-shaped stators of said first and second stator assemblies.

* * * * *